United States Patent
Norcross

(10) Patent No.: US 11,352,277 B2
(45) Date of Patent: Jun. 7, 2022

(54) VACFLUSH ADAPTOR FOR SUBMERSIBLE PUMPS

(71) Applicant: Evoqua Water Technologies LLC, Pittsburgh, PA (US)

(72) Inventor: Kenneth L. Norcross, Stilwell, KS (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 110 days.

(21) Appl. No.: 16/905,186

(22) Filed: Jun. 18, 2020

(65) Prior Publication Data
US 2020/0399156 A1 Dec. 24, 2020

Related U.S. Application Data

(60) Provisional application No. 62/864,588, filed on Jun. 21, 2019.

(51) Int. Cl.
| | | |
|---|---|---|
| *C02F 3/20* | (2006.01) | |
| *B01F 25/21* | (2022.01) | |
| *B01F 35/10* | (2022.01) | |
| *B01F 23/232* | (2022.01) | |
| *B01F 101/00* | (2022.01) | |

(52) U.S. Cl.
CPC ............. *C02F 3/20* (2013.01); *B01F 23/232* (2022.01); *B01F 25/21* (2022.01); *B01F 35/1452* (2022.01); *B01F 2101/305* (2022.01); *C02F 2303/20* (2013.01)

(58) Field of Classification Search
CPC .... C02F 2203/006; C02F 3/20; B01F 3/0446; B01F 5/0206; B01F 15/00025; B01F 2215/0052
USPC ................................................ 210/108, 629
See application file for complete search history.

(56) References Cited

U.S. PATENT DOCUMENTS 6,719,903 B1 * 4/2004 Pressley .............. B01F 13/1013
210/613

* cited by examiner

*Primary Examiner* — Claire A Norris

(57) ABSTRACT

Wastewater treatment systems are disclosed. A wastewater treatment system includes a wastewater conduit disposed in a wastewater treatment vessel, a pump comprising an intake and an outlet connectable to the at least one opening of the wastewater conduit, and an adapter comprising a first end and a second end. The adapter is configured, in a treatment mode, to provide a flow path for wastewater from the wastewater treatment vessel through the adapter and pump to the wastewater conduit. The adapter is further configured to, in a backflush mode, provide a flow path for wastewater through the plurality of nozzles of the wastewater conduit and through the adapter and pump for discharge into the wastewater treatment vessel. Methods of treating wastewater using the system and adapter are disclosed. Methods of retrofitting a wastewater treatment system by providing the adapter are disclosed.

15 Claims, 4 Drawing Sheets

VACFLUSH ADAPTOR FOR SUBMERSIBLE PUMPS

CROSS-REFERENCE TO RELATED APPLICATIONS

This application claims priority under 35 U.S.C. § 119(e) to U.S. Provisional Patent Application Ser. No. 62/864,588 titled "VacFlush Adapter for Submersible Pumps" filed Jun. 21, 2019, the entire disclosure of which is hereby incorporated herein by reference in its entirety for all purposes.

FIELD OF TECHNOLOGY

Aspects and embodiments disclosed herein are generally related to the field of treating wastewater using a wastewater treatment system.

SUMMARY

In accordance with one aspect, there is provided a wastewater treatment system. The wastewater treatment system may comprise a wastewater conduit disposed in a wastewater treatment vessel, the wastewater conduit comprising at least one opening and a plurality of nozzles, a pump comprising an intake and an outlet, and an adapter comprising a first end and a second end. The outlet of the pump may be connectable to the at least one opening of the wastewater conduit. The first end of the adapter may comprise a first interface connectable to the intake of the pump. The second end of the adapter may comprise a second interface that, in a treatment mode, is positioned within the wastewater vessel to provide a flow path for wastewater from the wastewater treatment vessel through the adapter and pump to the wastewater conduit, and, in a backflush mode, is connectable to the at least one opening of the wastewater conduit to provide a flow path for wastewater through the plurality of nozzles of the wastewater conduit and through the adapter and pump for discharge into the wastewater treatment vessel.

In certain embodiments, the outlet of the pump comprises an interface substantially identical to the second interface of the adapter. In some embodiments, the at least one opening of the wastewater conduit comprises a corresponding interface to the second interface of the adapter. In some embodiments, the first end of the adapter is connected to the intake of the pump in the treatment mode and in the backflush mode. In some embodiments, the first interface and second interface are disposed at substantially 90° angles relative to each other.

In some embodiments, the second end of the adapter is within an area occupied by the dimensions of the pump. In other embodiments, the second end of the adapter and the outlet of the pump are disposed substantially parallel to each other.

In further embodiments of the wastewater treatment system, the system may comprise a pump positioning sub-system. The pump positioning sub-system may comprise a rail fixedly secured to a location in the wastewater treatment vessel and a mating feature connectable to a corresponding mating feature on the pump, the pump configured to be positioned along a length of the rail. In some embodiments, the rail is aligned vertically, and the pump may be configured to travel along the vertically aligned rail.

In some embodiments, the outlet of the pump interfaces with the at least one opening of the wastewater conduit at a lowermost position of the pump on the vertically aligned rail. In some embodiments, the second interface of the adapter interfaces with the at least one opening of the wastewater conduit when the pump is disposed above a lowermost position on the vertically aligned rail.

In accordance with one aspect, there is provided a method of treating wastewater in a wastewater treatment system. The wastewater treatment system may include a wastewater conduit disposed in a wastewater treatment vessel. The wastewater conduit may be connected to the outlet of a pump having an adapter connected to the pump intake. The method may comprise operating the system in a treatment mode comprising aerating a flow of wastewater through the intake of the pump and providing a flow path for the wastewater from the wastewater treatment vessel through the adapter and pump to a plurality of nozzles of the wastewater conduit. The method may further comprise operating the system in a backflush mode comprising connecting the adapter to the wastewater conduit and providing a flow path for the wastewater through the plurality of nozzles of the wastewater conduit and through the adapter and pump for discharge into the wastewater treatment vessel.

In some embodiments, operating the system in the backflush mode occurs according to a predetermined schedule. In some embodiments, operating the system in the backflush mode is responsive to observing a visual change in the aerated wastewater, the visual change being indicative of increased aeration through a subset of the plurality of nozzles.

In further embodiments, the method may comprise stopping operation of the system in the backflush mode after a predetermined period.

In further embodiments, the method may comprise returning the system to the treatment mode by reconnecting the outlet of the pump to the wastewater conduit.

In accordance with one aspect, there is provided a method of retrofitting a wastewater treatment system. The wastewater treatment system may include a wastewater conduit comprising at least one opening and plurality of nozzles disposed in a wastewater treatment vessel. The method may comprise providing an adapter comprising a first end and a second end. The first end of the adapter may comprise a first interface connectable to an intake of a pump and the second end of the adapter may comprise a second interface connectable to the at least one opening of the wastewater conduit. The method may further comprise providing instructions to connect the first end of the adapter to the intake of the pump.

In further embodiments, the method may comprise providing instructions to operate the system in a treatment mode in which the second end of the adapter is positioned in the wastewater treatment vessel to provide a flow path for wastewater from the wastewater treatment vessel through the adapter and pump to the wastewater conduit.

In further embodiments, the method may comprise providing instructions to disconnect an outlet of the pump from the at least one opening of the wastewater conduit.

In further embodiments, the method may comprise providing instructions to connect the second end of the adapter to the at least one opening of the wastewater conduit to provide a flow path for wastewater through the plurality of nozzles of the wastewater conduit and through the adapter and pump for discharge into the wastewater treatment vessel.

In further embodiments, the method may comprise providing instructions to operate the system in a backflush mode, the backflush mode comprising operating the pump to direct wastewater into the plurality of nozzles of the wastewater conduit and through the adapter and pump for discharge into the wastewater treatment vessel.

In further embodiments, the method may comprise providing instructions to adjust a position of the pump using a pump positioning sub-system, the pump positioning sub-system comprising a vertically aligned rail along which the pump can travel, the outlet of the pump configured to interface with the at least one opening of the wastewater conduit at a lowermost position of the pump on the vertically aligned rail.

In further embodiments, the method may comprise providing instructions to adjust the position of the pump such that the second interface of the adapter interfaces with the at least one opening of the wastewater conduit when the pump is disposed above the lowermost position on the vertically aligned rail.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A illustrates a system with the pump at a lowermost position in the wastewater treatment vessel. FIG. 2B illustrates a system with the pump disposed above the lowermost position in the wastewater treatment vessel;

FIG. 3A illustrates the wastewater treatment system configured for operation in a treatment mode. FIG. 3B illustrates the wastewater treatment system configured for operation in a backflush mode.

DETAILED DESCRIPTION

Systems and methods for the treatment of wastewater are disclosed herein. The systems and methods described herein provide for the operation and cleaning of one or more components of a wastewater treatment system by dislodging and clearing contaminants from said one or more components of the wastewater treatment system.

Processes for the treatment of wastewater are known which include biological processes in which the wastewater is treated with microorganisms and separation steps where liquids and solid materials are separated. It is recognized that the processing of wastewater having higher mixed liquor suspended solids (MLSS) has certain advantages. The use of fine bubble diffusers in the processing of high MLSS wastewater for aeration of the wastewater is inconvenient for two main reasons. One reason is that as the mixed liquor concentration increases, the aeration efficiency of fine bubble diffusers greatly decreases. A second reason is that fine bubble diffusers foul rapidly in a very high suspended solids environment and thus require frequent maintenance and/or replacement.

Figure 1:
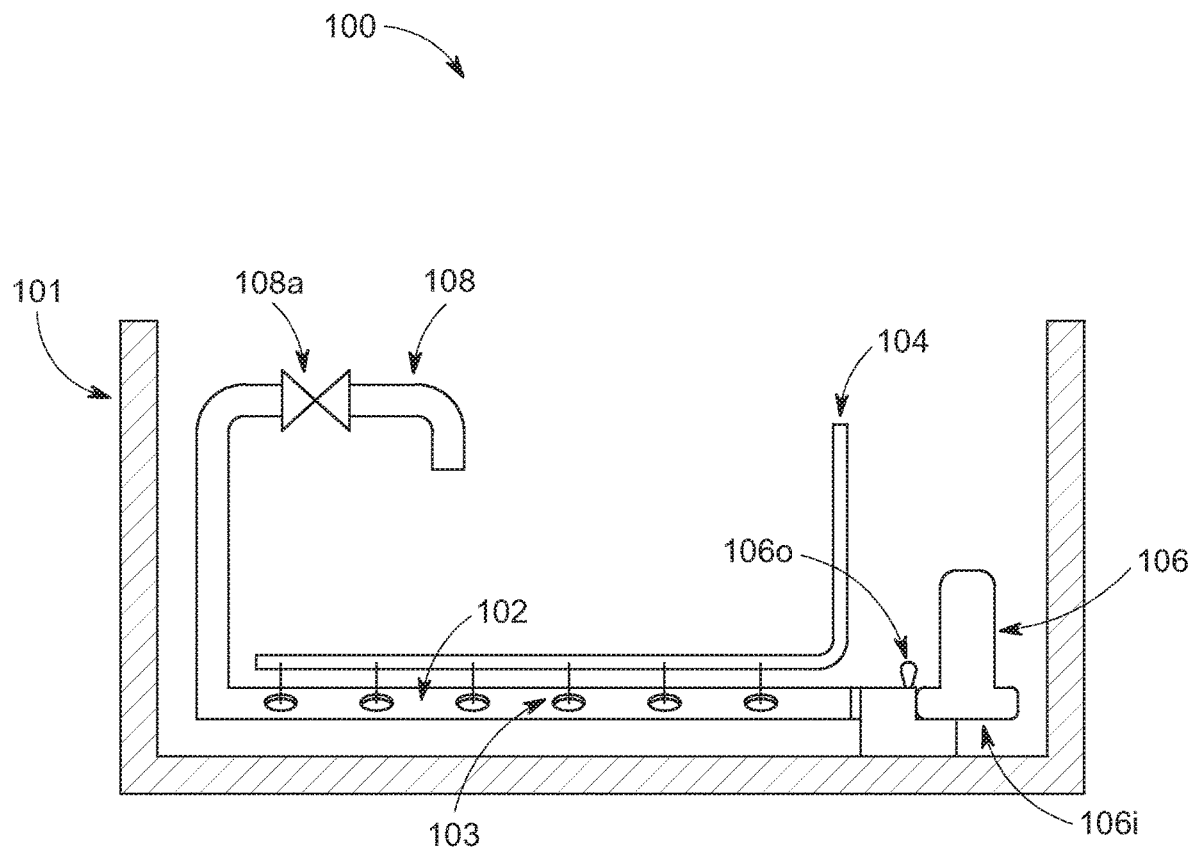
FIG. 1 illustrates a conventional pneumatic flushing system for a wastewater treatment system.

To circumvent the known issues with fine bubble diffusers, wastewater treatment systems have been recently equipped with gas jet nozzles configured to aerate the wastewater. When compared with fine bubble diffusers, the use of jets is advantageous in many respects. For example, alpha values, that is, the ratio of mass transfer coefficients from process water to clean water, for jet aeration systems are generally greater than those for fine bubble diffusers, in part due to higher mixing forces generated by jet aeration. Further, jet aerators tend to retain their higher alpha values during operation, even in high MLSS environments. Jet aeration also serves to agitate and mix the wastewater, eliminating or reducing the need for separate mixing and agitation steps. Jet aeration nozzles may utilize high volume air blowers for operation, which are energy intensive to operate and thus may add to the overall operating costs of the wastewater treatment system. Jet aeration nozzles generally tend to clog over time, reducing their aeration efficiency. Keeping the jet nozzles clean and free of obstructions is a priority during operation of the wastewater treatment system. One example of a wastewater treatment system having jet nozzles and a pneumatic flush line is illustrated in FIG. 1. With reference to FIG. 1, the pneumatic flush for the wastewater treatment system 100 operates by reversing the flow of wastewater through the jet nozzles 103 and directing the wastewater out through a pneumatic flush line 108 connected to the end of the wastewater conduit 102 disposed within a wastewater treatment vessel 101. Pump 106 has intake 106$i$ positioned towards the bottom the wastewater treatment vessel 101 and outlet 106$o$ connected to an opening of wastewater conduit 102. In pneumatic flushing, pump 106 is turned off to stop the flow of wastewater into wastewater conduit 102. Air enters air line 104 and will enter the wastewater conduit 102. The air will naturally rise to the highest point at the pneumatic flush line 108. A valve 108$a$ at pneumatic flush line 108 is opened and the air rushes out of the pneumatic flush line 108 into the wastewater treatment vessel 101. The air traveling up and out of the pneumatic flush line 108 creates an air lift pumping system and thus reverses the flow direction to draw air and wastewater into the plurality of nozzles 103, thus clearing contaminants from the plurality of nozzles 103. Pneumatic flushing, such as that of the system illustrated in FIG. 1, typically has low suction and its efficiency is dependent on the orientation of the jet nozzles relative to the wastewater conduit of the wastewater system. For example, pneumatic flushing is largely ineffective if the jet nozzles are orthogonal, that is, pointed at 90 degrees, relative to a flow axis through the wastewater conduit. This is because at nozzle angles of 90 degrees, there is insufficient air pressure to allow the wastewater in the wastewater treatment vessel to be pulled through the nozzle orifice and displace the air/wastewater mixture inside the wastewater conduit. When the nozzles are downward angled or canted, the air lifting process as described above is more efficient due to increased air pressure within the nozzle. Aspects and embodiments disclosed herein overcome or alleviate at least one of the disadvantages of pneumatic flushing maintenance processes such as in the system illustrated in FIG. 1.

A wastewater treatment system as disclosed herein may include a wastewater conduit disposed in a wastewater treatment vessel. The wastewater conduit may comprise at least one opening and a plurality of nozzles. A pump may comprise an intake and an outlet, with the outlet being connectable to the at least one opening of the wastewater conduit. An adapter may comprise a first end and a second end. The first end may comprise a first interface connectable to the intake of the pump. The second end may comprise a second interface that, in a treatment mode, is positioned within the wastewater vessel to provide a flow path for wastewater from the wastewater treatment vessel through the adapter and pump to the wastewater conduit. The second interface may, in a backflush mode, be connectable to the at least one opening of the wastewater conduit to provide a flow path for wastewater through the plurality of nozzles of the wastewater conduit and through the adapter and pump for discharge into the wastewater treatment vessel.

Systems of the present disclosure may allow for the plurality of nozzles to be positioned lower, that is, closer to the bottom of the wastewater treatment vessel, than in currently available jet aeration systems. Nozzles that are closer to the bottom of the wastewater treatment vessel are in fluid contact with a higher fraction of solid matter, thus increasing the contact time of the air bubbles with the wastewater. The increased contact time between air bubbles and wastewater may increase the aeration efficiency when aeration is performed using systems of the present disclosure. In some embodiments, systems of the present disclosure may allow for a reduction in the amount of time needed to operate the system in the backflush mode. In some embodiments, systems of the present disclosure may provide for a more effective cleaning of the plurality of nozzles, thus reducing system downtime. Under normal operation, a pneumatic flush system such as the system depicted in FIG. 1 that relies on an air lift pumping action may generate lower flow than an externally driven pump. Thus, the air lift mechanism cannot generate as much vacuum as the externally driven pump, and the increased vacuum generated by the pump may facilitate a more thorough clearing of debris from the plurality of nozzles.

The plurality of nozzles may be in fluid communication with the wastewater conduit such that wastewater (and optionally, air) can be directed out of the plurality of nozzles and into the wastewater treatment vessel. The wastewater conduit may comprise any number of nozzles sufficient to provide for efficient aeration and mixing of influent wastewater. The number of nozzles may be determined by at least the size of the wastewater treatment system. In some embodiments, the plurality of nozzles may be internally shaped as a truncated cone and have discharge openings or apertures therein having a cross-section smaller than the rest of the nozzles. The plurality of nozzles may be oriented at any angle relative to the axis of flow through the wastewater conduit. For example, the plurality of nozzles may be oriented at 90° relative to the flow axis. Alternatively, the plurality of nozzles may be angled downward, that is, having the nozzle orifice directed towards the bottom of the wastewater treatment vessel, at any angle that provides for efficient operation of the system. The plurality of nozzles may all be oriented at the same angle. Alternatively, the plurality of nozzles may all be oriented at different angles and any combination of angles therebetween. The invention described herein is not limited to any particular nozzle orientation or combination of nozzle orientations relative to the flow axis through the wastewater conduit.

The adapter may be of any suitable shape that allows for it to be connectable to the desired locations in the system, such as at least one opening of the wastewater conduit and one or more ports on a pump. For example, the adapter may be shaped such that the first interface and second interface are disposed at substantially 90° angles relative to each other. An adapter having this characteristic may have each interface positioned on an arm. In some embodiments, each arm of the adapter may be symmetric, that is, each arm of the adapter may be substantially the same length and/or width. Alternatively, the adapter may have asymmetric arms, that is, one arm may be of a different dimension than the other. For example, the adapter may have one arm that has a longer or shorter length relative to the other arm. One of skill in the art can appreciate that the shape and dimensions of the adapter may be determined by the specific pump it is to be connected to and the identity and position of one or more components in the system. One of skill in the art can further appreciate that any aspect of the adapter can be varied as needed to provide the correct fitment to said one or more system components.

The adapter may include first and second interfaces at the first and second ends, respectively, that are configured to be connectable to various components in the system, such as an opening of the wastewater conduit and one or more ports on a pump. The first and second interfaces may be any suitable interface that can provide a tight seal to the component while allowing the adapter to be removed from the component. For example, the first and second interfaces may connect to the components of the system using a hook, tongue-and-groove, a dovetail, slip fit, or other type of mechanical connection known in the art. The chosen interface may be a separate component that is connected to the pump by an end user or operator, such as by attaching a flange to a pump port. Alternatively, the chosen interface(s) may be directly integrated into the pump port(s) from the pump manufacturer. In some embodiments, the first and second interfaces may include a grooved fitting having a gasket or O-ring attached to the adapter or the system component. In this configuration, the gasket or O-ring separates the adapter from the corresponding interface or mating feature of the system component, and the forces applied during operation of the system, such as water pressure or vacuum applied from the pump, are sufficient to maintain a sealed connection between the first and second interfaces of the adapter and the component connected to each interface. In some embodiments, the first and second interfaces may be the same type of interface. Alternatively, the first and second interfaces may be different types of interfaces. One of skill in the art can appreciate that the type of interfaces for each end of the adapter may be determined by the location and identity of the components being connected by the adapter, tolerances for leaks, and desired maneuverability of the adapter and/or pump once connected.

In some embodiments, the pump may be a submersible pump that remains submerged in the wastewater treatment vessel during operation in the treatment mode and the backflush mode. The intake and outlet of the pump may include connection interfaces as described herein that correspond with connection interfaces found on other system components, such as conduits, manifolds, and adapters. In some embodiments, one of the pump ports, such as the intake that is configured to be connectable to the first interface of the first end of the adapter, may include securing features that allow the adapter to remain connected to the pump when the pump is maneuvered in the wastewater treatment vessel. For example, the first interface may be configured to be connected to the intake of the pump using a clamp or other mechanical fastener, such as bolts or the like. In some embodiments, the at least one opening of the wastewater conduit may comprise a corresponding interface to the second interface of the second end of the adapter.

In some embodiments, the first end of the adapter may be connected to the intake of the pump in the treatment mode and in the backflush mode. In this configuration, the adapter can remain connected to the intake of the pump when the operating mode of the system is changed. For example, when the system is to be changed from the treatment mode to the backflush mode, the pump may be stopped and the pump with the connected adapter moved within the wastewater treatment vessel to a location providing for the second end of the adapter to be connected to an opening of the wastewater conduit. This may reduce pump and system downtime as the pump does not have to be removed from the system to be positioned in a different location. To accommodate the pump with the connected adapter, the pump may be positioned in a location that has sufficient horizontal and/or vertical clearance. Alternatively, the pump with the connected adapter may be positioned within a basin or other recess within the wastewater treatment vessel.

In some embodiments, the second end of the adapter is within an area occupied by the dimensions of the pump. In typical use, the pump is positioned within a pre-defined space inside of a larger wastewater treatment vessel that cannot be modified. Having the second end of the adapter fit within the dimensions of the pump allows for the pump to be maneuvered within its pre-defined space to connect the adapter to an opening of the wastewater conduit with a reduced amount of maneuvering required. As a non-limiting example, the second end of the adapter, when connected to the pump may be positioned in the same vertical plane as the outlet of the pump; an example of this is illustrated in FIG. 2B. In this configuration, the pump can be maneuvered to allow the second end of the adapter to interface with the wastewater conduit in a simple vertical motion. Alternatively, it is recognized that other lengths of the adapter, such as longer adapter, may be utilized to allow for facile connection between the adapter and other system components. In some embodiments, when the adapter is connected to the pump, the second end of the adapter and the outlet of the pump may be disposed substantially parallel to each other. As a non-limiting example, the pump may be lifted vertically, and optionally rotated 180°, to facilitate connecting the second end of the adapter to the at least one opening of the wastewater conduit.

In some embodiments, the wastewater treatment system disclosed herein may include a pump positioning sub-system. The pump positioning sub-system may include a rail fixedly secured to a location in the wastewater treatment vessel and a mating feature connectable to a corresponding mating feature on the pump. In this configuration, that is, when the pump is connected to the rail via the corresponding mating features, the pump can be positioned along a length of the rail. The rail may be a vertically aligned rail that is fixedly secured to a location with the wastewater treatment vessel. For example, the vertically aligned rail may be fixedly secured to a wall of the wastewater treatment vessel and located in proximity to the system components the pump is configured to connect to. In this implementation, the pump may be configured to travel up and down along the length of the vertically aligned rail to facilitate connection to the various components of the wastewater treatment system. The mating features between the pump and the rail may be any practical mating features that allow the pump to be positioned along the rail without becoming disconnected while being maneuvered, such as a dovetail, ball bearing slides, screw driven linear actuators, and the like. When connected to the rail, the pump may be moved along the length of the rail by any suitable mechanism, such as a winch, pulley system, a crane, or similar mechanisms.

Figure 2A:
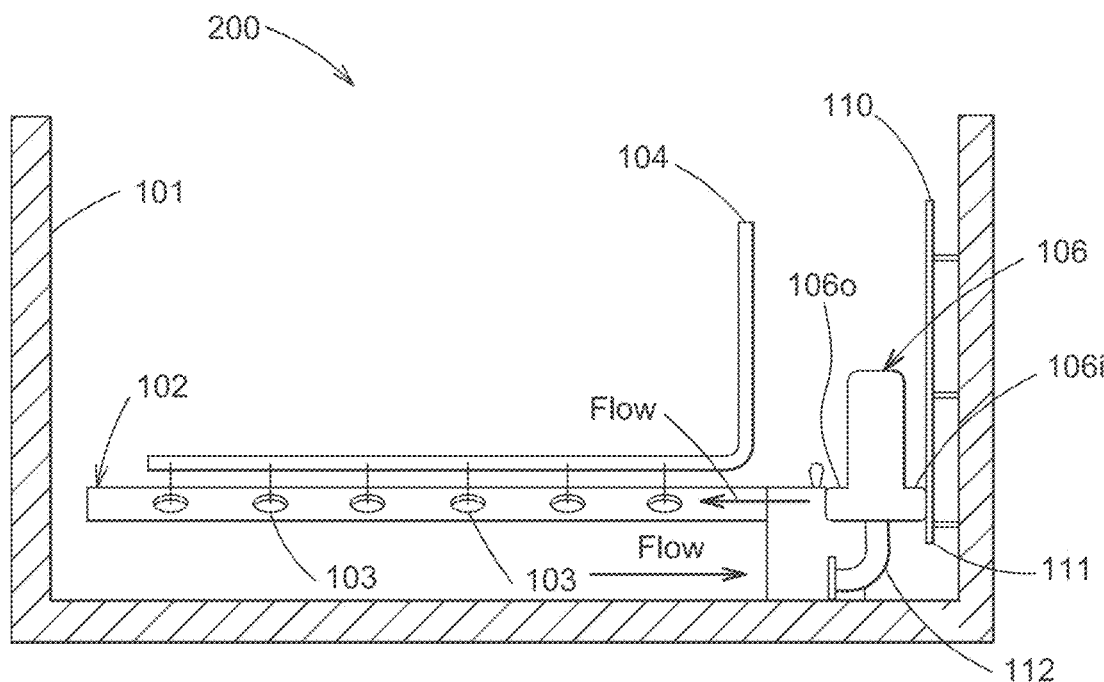
FIGS. 2A-2B illustrate a wastewater treatment system including an adapter connected to a pump, according to one embodiment.
Figure 2B:
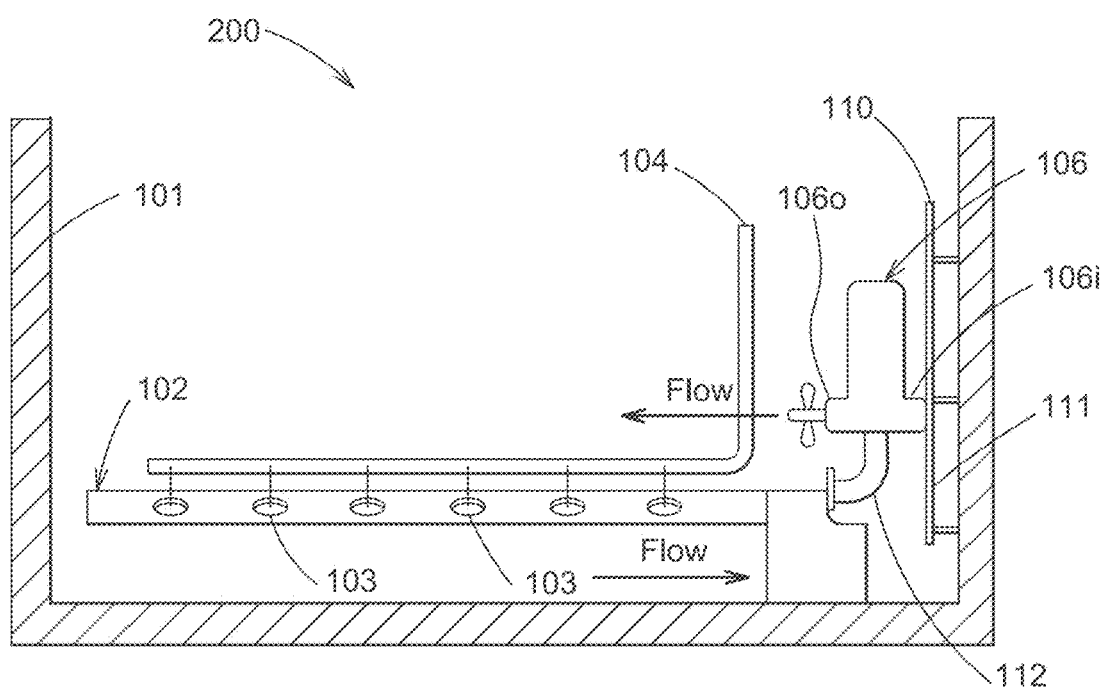

When operating in a treatment mode, wastewater may be directed into the adapter connected to the pump intake and through the pump and adapter into an opening of the wastewater conduit for aeration and mixing by the plurality of nozzles, such as in the system configuration illustrated in FIG. 2A. With reference to FIG. 2A, wastewater is directed from the intake of a pump 106 with an adapter 112 having its first end connected to intake 106i of pump 106. The outlet 106o of pump 106 is connected to the wastewater conduit 102 having the plurality of nozzles 103 disposed in wastewater treatment vessel 101. Pump 106 is further connected to pump positioning sub-system 110 and is disposed at a lowermost position on the vertically aligned rail 111. In this configuration, outlet 106o of the pump 106 can be connected to an opening of the wastewater conduit 102 to provide a flow path for wastewater from the wastewater treatment vessel 101 through the adapter 112 and pump 106 into the wastewater conduit 102. Air from the source of air 104 mixes with the wastewater in the wastewater conduit 102 and the mixture is discharged from the plurality of nozzles 103 into the wastewater treatment system 200.

When the wastewater treatment system is to be backflushed, such as on a predetermined schedule or when a visual check of the aeration indicates improper operation, the pump may be stopped and then positioned along the rail of the pump positioning sub-system to move the pump and adapter to a position where the second end of the adapter may be connected to the at least one opening of the wastewater conduit. A system in this configuration is illustrated in FIG. 2B. With reference to FIG. 2B, pump 106 can be moved along vertically aligned rail 111 of pump positioning sub-system 110 to allow the pump 106 with the adapter 112 connected to intake 106i to be disposed above a lowermost position on the vertically aligned rail 111. When pump 106 is disposed above the lowermost position on the vertically aligned rail 111, the second end of adapter 112 can be connected to the opening of the wastewater conduit 102 disposed in wastewater treatment vessel 101. In this configuration, the adapter provides a flow path for wastewater through the plurality of nozzles 103 of the wastewater conduit 102 and through the adapter 112 and pump 106 for discharge into the wastewater treatment vessel 101 of the wastewater treatment system 200. Under operation of the pump 106, this connection directs wastewater through the plurality of nozzles 103 into the adapter 112 and out through the outlet 106o of pump 106; this creates suction through the plurality of nozzles 103 that can clear contaminants or obstructions.

Figure 3A:
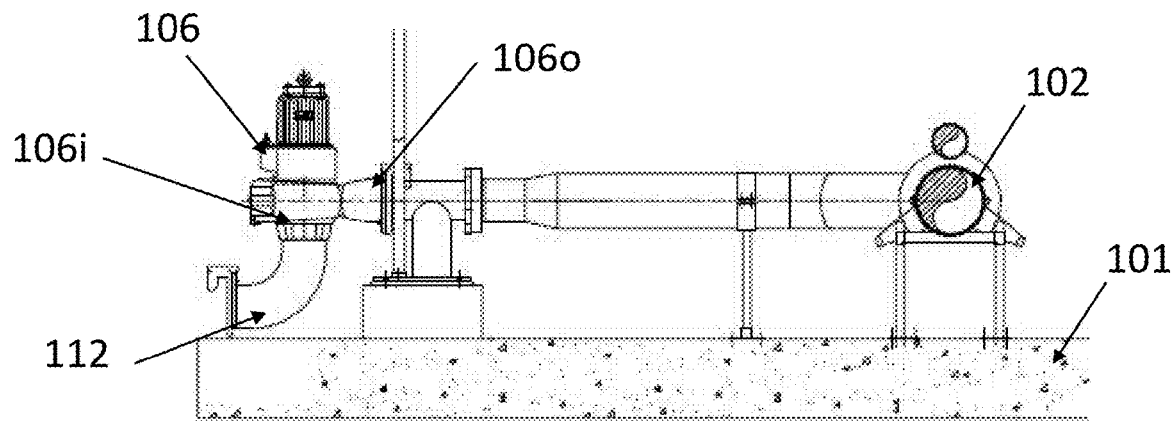
FIGS. 3A-3B illustrates a wastewater treatment system including a pump having an adapter connected to the pump intake.
Figure 3B:
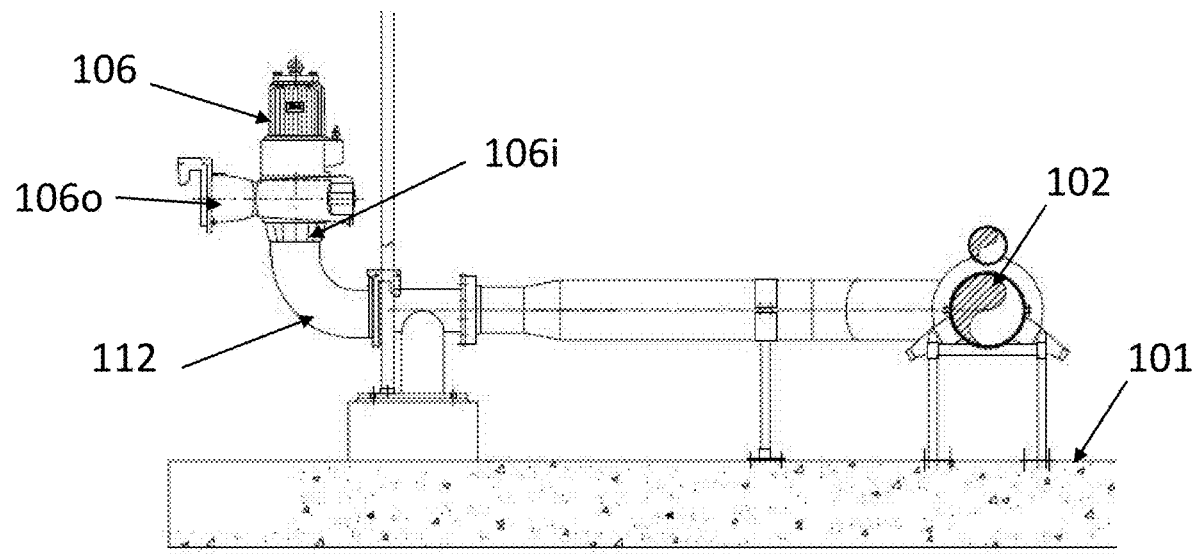

FIGS. 3A-3B illustrates a wastewater treatment system similar to that illustrated in FIGS. 2A-2B. With reference to FIG. 3A, the wastewater treatment system 100 has pump 106 with an adapter 112 connected at its intake 106i. The second end of the adapter 112 includes a hook interface and is positioned in the wastewater treatment vessel 101 to act as a flow path for wastewater into the pump 106. The second end of the adapter 112 is positioned in a basin below the bottom floor of wastewater treatment vessel 101. The outlet 106o of pump 106 is connected to an opening in wastewater conduit 102. In this configuration, the pump 106 is operating in a treatment mode and is pumping wastewater into the adapter 112 through intake 106i and discharging into the wastewater conduit 102 through outlet 106o. With reference to FIG. 3B, the pump 106 has been maneuvered and turned 180° to allow the hook interface of the second end of the adapter 112 to connect to a corresponding raised edge on the opening of the wastewater conduit 102. In this configuration, the pump 106 is operating in backflush mode by directing wastewater into the wastewater conduit 102 and into the adapter 112 and discharging into the wastewater treatment vessel 101 through the outlet 106o of pump 106.

In accordance with another aspect, there is provided a method of treating wastewater in a wastewater treatment system. The wastewater treatment system may comprise a wastewater conduit disposed in a wastewater treatment vessel. The wastewater conduit may be connected to an outlet of a pump as described herein with the pump comprising an adapter connected to the pump intake. The method may comprise operating the system in a treatment mode comprising aerating a flow of wastewater through the intake of the pump and providing a flow path for the wastewater from the wastewater treatment vessel through the adapter and pump to a plurality of nozzles of the wastewater conduit. The method may additionally comprise operating the system in a backflush mode comprising connecting the adapter to the wastewater conduit and providing a flow path for the wastewater through the plurality of nozzles of the wastewater conduit and through the adapter and pump for discharge into the wastewater treatment vessel.

In some embodiments of the method of treating wastewater, operating the system in the backflush mode may occur according to a predetermined schedule. For example, the plurality of nozzles positioned within the wastewater treatment system should be cleaned on a regular basis to maintain system, that is, aeration, performance. The system may be operated in the backflush mode at any practical interval of time, for example, once per week, biweekly, monthly, or in any time interval therebetween.

In some embodiments of the method of treating wastewater, operating the system in the backflush mode may be responsive to observing a visual change in the aerated wastewater, the visual change being indicative of increased aeration through a subset of the plurality of nozzles. For example, aeration of wastewater typically produces a well-defined flow pattern that is visible from a top-down or side view of the wastewater treatment vessel. As a subset of the plurality of nozzles becomes clogged and unable to pass wastewater therethrough, more of the influent flow of wastewater is discharged through a fewer number of nozzles. This increases the pressure of the wastewater through each of the remaining nozzles and can lead to a "geyser" effect that may produce a change in the flow pattern visible from the top of the wastewater treatment vessel. Each indicator described herein may signal to a user or operator that the flow of wastewater into the wastewater conduit should be stopped such that the pump can be maneuvered and re-positioned to begin operating in the backflush mode.

In some embodiments, the method of treating wastewater may further include stopping operation of the system in the backflush mode after a predetermined period. The predetermined period may be any practical time period that clears obstructions from the plurality of nozzles. The system may be operated in the backflush mode for any necessary amount of time, such as seconds, minutes, or hours; the amount of time necessary to operated they system in the backflush mode may be determined by the number of the plurality of nozzles that appear to be obstructed or the amount of solids present in the wastewater treatment vessel. In some embodiments, the method of treating wastewater may further comprising returning the system to the treatment mode by reconnecting the outlet of the pump to the wastewater conduit.

In accordance with another aspect, there is provided a method of retrofitting a wastewater treatment system. The wastewater treatment system may comprise a wastewater conduit comprising at least one opening and plurality of nozzles disposed in a wastewater treatment vessel. The method may comprise providing an adapter comprising a first end and a second end, the first end comprising a first interface connectable to an intake of a pump and the second end comprising a second interface connectable to the at least one opening of the wastewater conduit. The method may further comprise providing instructions to connect the first end of the adapter to the intake of the pump.

In some embodiments of the method of retrofitting, the method may further comprise providing instructions to operate the system in a treatment mode in which the second end of the adapter is positioned in the wastewater treatment vessel to provide a flow path for wastewater from the wastewater treatment vessel through the adapter and pump to the wastewater conduit. In some embodiments of the method of retrofitting, the method may further comprise providing instructions to disconnect an outlet of the pump from the at least one opening of the wastewater conduit. In some embodiments of the method of retrofitting, the method may further comprise providing instructions to connect the second end of the adapter to the at least one opening of the wastewater conduit to provide a flow path for wastewater through the plurality of nozzles of the wastewater conduit and through the adapter and pump for discharge into the wastewater treatment vessel. In some embodiments of the method of retrofitting, the method may further comprise providing instructions to operate the system in a backflush mode. The backflush mode may be as described herein, with the backflush mode comprising operating the pump to direct wastewater into the plurality of nozzles of the wastewater conduit and through the adapter and pump for discharge into the wastewater treatment vessel. In some embodiments of the method of retrofitting, the method may further comprise providing instructions to adjust a position of the pump using a pump positioning sub-system. For example, the pump positioning sub-system may be a pump positioning sub-system as described herein that may comprise a vertically aligned rail fixedly secured to a location in the wastewater treatment vessel along which the pump can travel. The outlet of the pump may be configured to interface with the opening of the wastewater conduit at a lowermost position of the pump on the vertically aligned rail. In some embodiments of the method of retrofitting, the method may further comprise providing instructions to adjust the position of the pump such that the second interface of the adapter interfaces with the opening of the wastewater conduit when the pump is disposed above the lowermost position on the vertically aligned rail.

Examples

The function and advantages of these and other embodiments can be better understood from the following examples. These examples are intended to be illustrative in nature and are not considered to be in any way limiting the scope of the invention.

The invention disclosed herein may provide benefits over currently existing jet aeration systems. As an example, systems disclosed herein provide for a more effective cleaning of the plurality of jet nozzles. The pump-based jet nozzle cleaning disclosed herein is more effective for several reasons. First, the use of a pump-driven backflush system can increase the backflush flow rate through the jet nozzles. A pneumatic flush system with an air lift typically produces approximately 30-40% of the flow compared to an externally driven pump. Second, in pneumatic flush systems, the pump is not isolated from the overall wastewater treatment system with a valve. Thus, the wastewater being drawn in can come through the pump and not through the jet nozzles as expected. Last, the pump creates more vacuum on the jet nozzles than the air lift action and can thus remove more debris from the jet nozzles.

Figure 4:
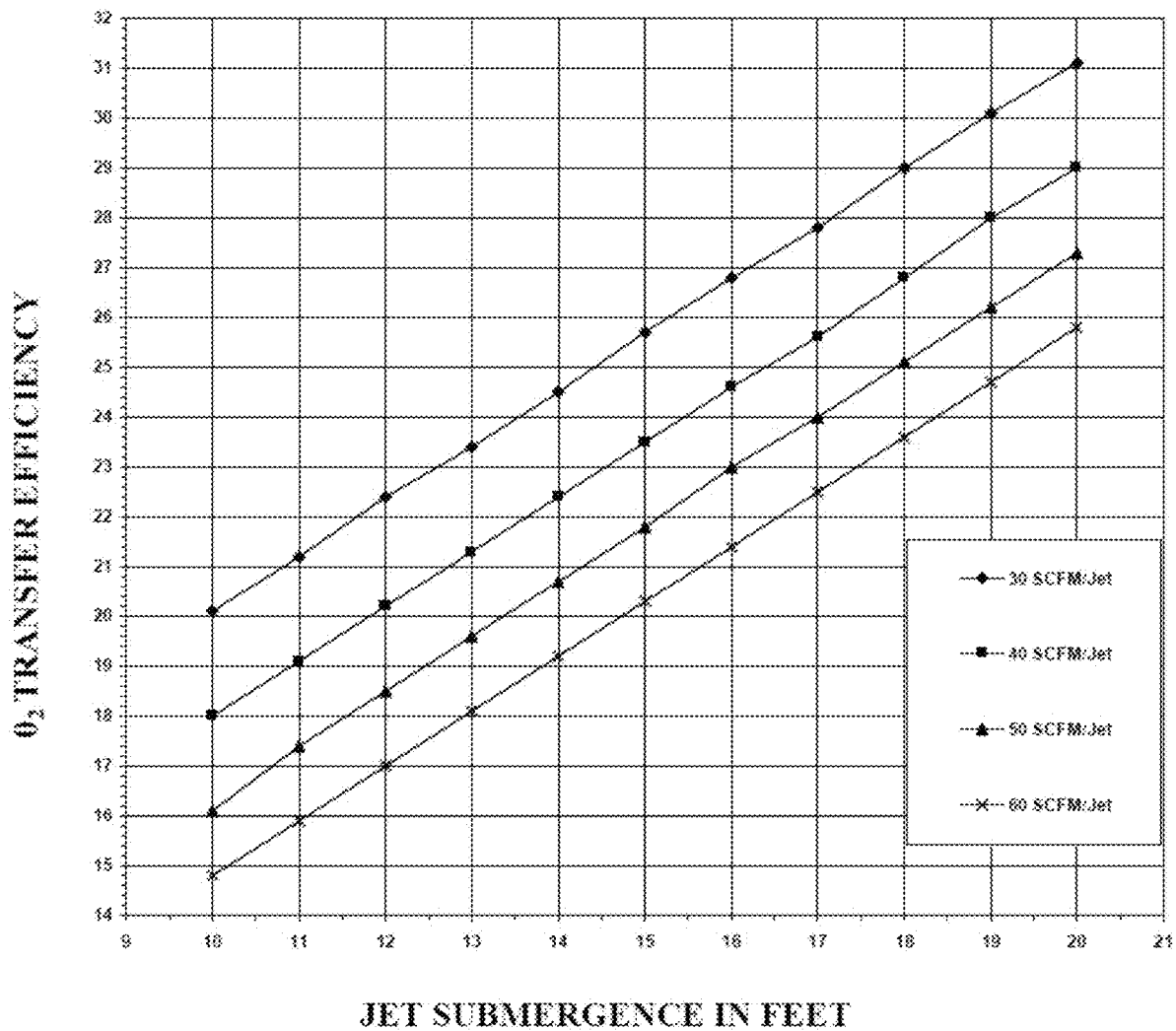
FIG. 4 illustrates the relationship between aeration efficiency and nozzle depth in a wastewater treatment vessel.

Because the jet nozzles can be more thoroughly cleaned using the pump driven backflush described herein, the jet nozzles can be placed lower into the wastewater treatment vessel, which in turn increases aeration efficiency. Nozzles that are closer to the bottom of the wastewater treatment vessel are in fluid contact with a higher fraction of solid matter, thus increasing the contact time of the air bubbles with the wastewater. The aeration efficiency is measured as the oxygen transfer efficiency per unit depth of jet nozzle depth. FIG. 4 illustrates the oxygen transfer efficiency as a function of jet nozzle depth for different jet pumping speeds. As is seen in FIG. 4, the increase in aeration efficiency is approximately 1.25%-1.5% per foot of jet nozzle submergence, independent of jet pumping speed. The gain in efficiency is, in part, correlated to the overall depth of the wastewater treatment vessel. As the wastewater treatment vessel depth increases, there is less of an improvement in oxygen transfer efficiency per foot of jet nozzle submergence.

For a wastewater treatment vessel that is 22.5 feet deep, jet nozzles that are canted downward at 30 degrees are approximately 2.5 feet off of the bottom of the wastewater treatment vessel resulting in a submergence depth of 20 feet. If the oxygen transfer efficiency as defined above is 1.25% per foot of submergence, the overall oxygen transfer efficiency will be 25% for the wastewater treatment system. For the same wastewater treatment system using straight, that is, 90 degree positioned, jet nozzles that are positioned 1.5 feet off of the bottom of the wastewater treatment vessel, this changes the submerged depth of the jet nozzles to 21 feet. Under the same approximation for oxygen transfer efficiency, the overall oxygen transfer efficiency will be 26.25% for the wastewater treatment system, resulting in a net 5% increase in aeration efficiency over the system with downward angled jet nozzles. Thus, the more effective cleaning of the jet nozzles using the pump driven backflush allows for the use of straight or 90 degree positioned jet nozzles that were more difficult to clean using the pneumatic flush system.

The more thorough cleaning of the nozzles can reduce the frequency of cleaning as more contaminants and debris are cleared per each cycle. The pneumatic flush system is typically performed once per week for approximately 20 minutes. As the pump is more powerful than the air lift mechanism of the pneumatic flush system, the wastewater treatment system can be backflushed about once per month with a cycle time of less than 5 minutes. The reduced cycle time allows the wastewater treatment system to resume operations faster and reduces costs associated with system downtime.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only. Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A wastewater treatment system, comprising:
    a wastewater conduit disposed in a wastewater treatment vessel, the wastewater conduit comprising at least one opening and a plurality of nozzles;
    a pump comprising an intake and an outlet, the outlet connectable to the at least one opening of the wastewater conduit; and
    an adapter comprising a first end and a second end, the first end comprising a first interface connectable to the intake of the pump, the second end comprising a second interface that, in a treatment mode, is positioned within wastewater within the wastewater vessel to provide a flow path for the wastewater from the wastewater treatment vessel through the adapter and pump to the wastewater conduit, and, in a backflush mode, is configured to be connected to the at least one opening of the wastewater conduit to provide a flow path for wastewater through the plurality of nozzles of the wastewater conduit and through the adapter and pump for discharge into the wastewater treatment vessel.

2. The system of claim 1, wherein the outlet of the pump comprises an interface substantially identical to the second interface of the adapter.

3. The system of claim 2, wherein the at least one opening of the wastewater conduit comprises a corresponding interface to the second interface of the adapter.

4. The system of claim 1, wherein the first end of the adapter is connected to the intake of the pump in the treatment mode and in the backflush mode.

5. The system of claim 4, wherein the first interface and second interface are disposed at substantially 90° angles relative to each other.

6. The system of claim 1, further comprising a pump positioning sub-system comprising a rail fixedly secured to a location in the wastewater treatment vessel and a mating feature connectable to a corresponding mating feature on the pump, the pump configured to be positioned along a length of the rail.

7. The system of claim 6, wherein the rail is aligned vertically.

8. The system of claim 7, wherein the pump is configured to travel along the vertically aligned rail.

9. The system of claim 8, wherein the outlet of the pump interfaces with the at least one opening of the wastewater conduit at a lowermost position of the pump on the vertically aligned rail.

10. The system of claim 9, wherein the second interface of the adapter interfaces with the at least one opening of the wastewater conduit when the pump is disposed above a lowermost position on the vertically aligned rail.

11. A method of treating wastewater in a wastewater treatment system comprising a wastewater conduit disposed in a wastewater treatment vessel with the wastewater conduit connected to an outlet of a pump having an adapter connected to the pump intake, the method comprising:

operating the system in a treatment mode comprising aerating a flow of wastewater through the intake of the pump and providing a flow path for the wastewater from the wastewater treatment vessel through the adapter and pump to a plurality of nozzles of the wastewater conduit; and operating the system in a backflush mode comprising connecting the adapter to the wastewater conduit and flowing the wastewater through the plurality of nozzles of the wastewater conduit and through the adapter and pump for discharge into the wastewater treatment vessel.

12. The method of claim 11, wherein operating the system in the backflush mode occurs according to a predetermined schedule.

13. The method of claim 11, wherein operating the system in the backflush mode is responsive to observing a visual change in a flow pattern in the aerated wastewater visible from the top of the wastewater treatment vessel, the visual change being indicative of increased aeration through a subset of the plurality of nozzles.

14. The method of claim 11, further comprising stopping operation of the system in the backflush mode after a predetermined period.

15. The method of claim 14, further comprising returning the system to the treatment mode by reconnecting the outlet of the pump to the wastewater conduit.

* * * * *